April 21, 1953 — R. R. SCHMITT — 2,635,577
TIRE PRESSURE INDICATOR
Filed Sept. 14, 1950

INVENTOR.
RICHARD R. SCHMITT
BY
Edward J. Connor Jr.
AGENT

UNITED STATES PATENT OFFICE 2,635,577

TIRE PRESSURE INDICATOR

Richard R. Schmitt, Kansas City, Mo.

Application September 14, 1950, Serial No. 184,880

1 Claim. (Cl. 116—34)

This invention appertains to improvements in pressure indicators for pneumatic tires and has for its primary object to audibly indicate on each rotation of the wheel the lack of sufficient operating pressure in the tire mounted on the wheel.

Another important object of this invention is to audibly indicate a low pressure in a tire by providing a resilient clicker, which clicks on each rotation of the wheel, if the tire is under inflated, and which is designed for application on various makes and sizes of wheels, rims and tires.

Another important object of this invention is to provide a simple and inexpensive indicator for tires which is easily mounted between the tire rim and the bead of the tire and is inexpensively manufactured in a precision manner.

These and ancillary objects and structural features of merit are attained by this invention, the preferred embodiment of which is set forth in the following description and illustrated in the accompanying drawing, wherein.

Figure 1:
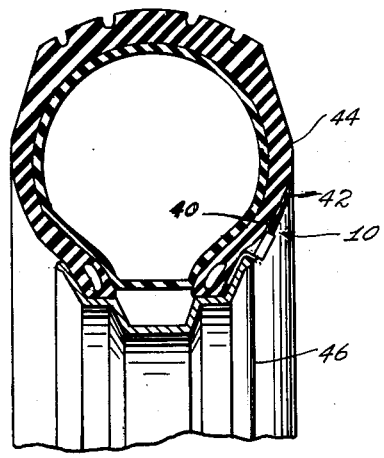
Figure 1 is a cross sectional view of a tire mounted on a rim and having the indicator of this invention operatively associated therewith.
Figure 2:
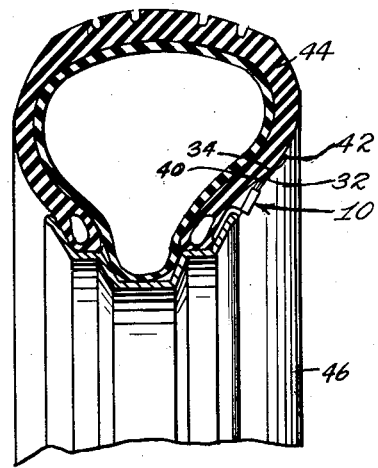
Figure 2 is a similar view with the tire shown underinflated to depict the reaction of the indicator.
Figure 3:
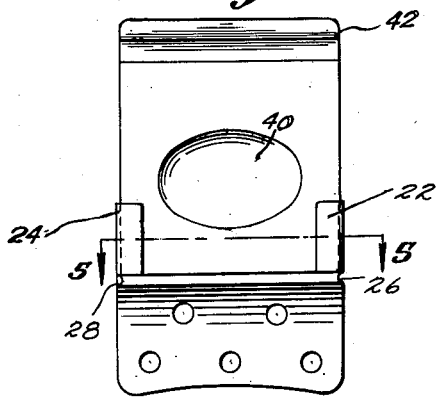
Figure 3 is an elevational view of the inner face of the indicator.
Figure 4:
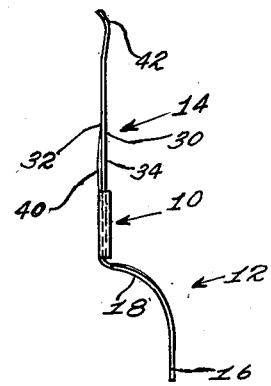
Figure 4 is an end elevational view.
Figure 5:
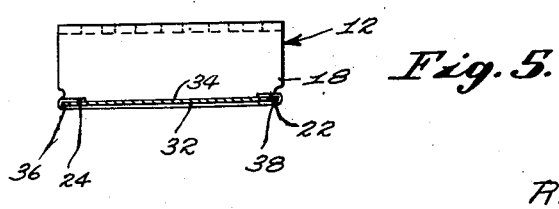
Figure 5 is a transverse sectional view taken on line 5—5 of Figure 3.

Referring now more particularly to the drawing, the indicator 10 includes a rigid angular supporting member 12 which forms the attaching element for the clicker 14 constituting the audible element of the indicator. The supporting member 12 is formed from rigid sheet material and is bent transversely midway its ends to provide a vertical base section 16 and a horizontal supporting section 18, the base section being apertured to permit the surface of the tire bead to partially enter or belly through the apertures when the tire is under pressure. Thus, the base section is firmly anchored between the tire and the rim.

At the opposing sides of the end 20 of the section 18, upstanding clamping ears 22 and 24 are integrally formed for the reception of the clicker 14, with semi-circular grooves 26 and 28 being formed in the marginal edges of the end 20 to permit the ears to clampingly engage the clicker.

The clicker 14 is formed from pretempered spring material which is formed in elongated strips and then transversely severed at spaced points. The clicker is formed with a lower end 30, having an inner face 32 and an outer face 34 when the clicker is mounted on a rim, as will be later discussed. The marginal side edges 36 and 38 of the lower end are substantially flat and are clampingly engaged by the ears to rigidly secure the clicker to the supporting member 12. A concavo-convex depressible oval shaped section 40 is formed in the lower end with the convex surface bulging, in normal tire position, from the inner face 32. The upper end 42 of the clicker is curved in the form of a U in cross section.

To install the indicator, the air is released from the tire 44 until the tire is completely deflated. The bead of the tire is loosened from the rim 46 and pushed back to permit insertion of the base section 16.

The tire is then reflated by the recommended air pressure with the supporting section or member 12 held between the tire and the rim upon reflating of the tire to engage the rim and clamp the supporting section thereto.

In use, the inner face 32 of the resilient clicker will be spaced from the side of the tire and the upper end 42 will engage the side wall or web of the tire at its inner curved face. When the pressure in the tire is not at the proper poundage and the tire becomes deflated, the tire wall will bulge against the convex side of the depressible section 40 and force it outwardly causing a "clicking" noise. Thereupon, at each rotation of the wheel, the section 40 will flex and click to audibly give a warning and indicate the low pressure condition of the tire. The flexing of the section is, of course, occasioned by the forcing outwardly of the convex inner side thereof by the portion of the side wall or web of the tire in engagement with the side, as the peripheral section of the tire in alignment with the engaged portion of the side wall rides on the surface. The inward return to normal position of the section will occur upon the travel of the aligned tire section from road engagement. Thus, a continual flexing of the section outwardly will occur as the wheel rotates to produce the "clicking" noise.

Having thus described the invention, what is claimed is:

An audible tire pressure indicator comprising a mounting member having an arcuate end including an inner and outer section, the inner section being formed to conform to the inner surface of a tire flange and having a series of spaced perforations formed therein and adapted to be inserted between the bead of a tire and the inner surface of a rim flange with the tire bellying through the perforations to clamp the section to the rim flange, the outer section being adapted to seat on the edge of the flange, a flat outer end of the member extending outwardly substantially normal to the outer section and adapted to project from the rim flange in substantial parallelism therewith, a sound plate, means on the outer end of the member attaching one end of the plate thereto, said plate being adapted to radially overlie the side wall of the tire and engage the side wall and having its outer free end inturned against the side wall of the tire, and a depressible dimpled portion in th plate, which is adapted to be flexed by the side wall when the tire is below a predetermined pressure.

RICHARD R. SCHMITT.

References Cited in the file of this patent

UNITED STATES PATENTS

| Number | Name | Date |
| --- | --- | --- |
| 1,291,647 | Langham | Jan. 14, 1919 |
| 1,409,360 | Clarke | Mar. 14, 1922 |
| 1,734,275 | Simpson | Nov. 5, 1929 |
| 2,444,856 | Sievers | July 6, 1948 |
| 2,481,166 | Sievers | Sept. 6, 1949 |
| 2,532,199 | Sievers | Nov. 28, 1950 |